United States Patent [19]

Barkhau et al.

[11] 4,389,725
[45] Jun. 21, 1983

[54] ELECTRIC BOOSTING CONTROL FOR A GLASS FOREHEARTH

[75] Inventors: Marvin L. Barkhau, Elmore; Philip D. Perry, Toledo, both of Ohio; Roland F. Pimm, Manteca, Calif.

[73] Assignee: Owens-Illinois, Inc., Toledo, Ohio

[21] Appl. No.: 287,382

[22] Filed: Jul. 27, 1981

[51] Int. Cl.³ .................................................. C03B 5/02
[52] U.S. Cl. .................................. 373/40; 65/135; 65/337
[58] Field of Search .................. 373/29, 30, 39, 40, 373/41; 65/135, 136, 337

[56] References Cited

U.S. PATENT DOCUMENTS

| | | | |
|---|---|---|---|
| 3,836,689 | 9/1974 | Holler et al. | 373/40 |
| 3,954,433 | 5/1976 | Holler | 65/337 |
| 4,029,488 | 6/1977 | Rhett | 65/135 |
| 4,227,909 | 10/1980 | Hornyak, Jr. et al. | 65/135 |
| 4,247,733 | 1/1981 | Stevenson | 373/41 |

Primary Examiner—Roy N. Envall, Jr.
Attorney, Agent, or Firm—Gerald T. Welch; Myron E. Click; David H. Wilson

[57] ABSTRACT

Molten glass entering from a refiner is conditioned, in an optimum operation, such that its temperature along the center of the flowing glass just in advance of its entry into the feeder, will be of equal temperature near the surface near the bottom and intermediate these two points. A tri-level thermocouple is positioned along the center line at approximately nine inches from the feeder for monitoring these temperatures, and to serve as an aid to the operator in controlling the actual glass temperature. Positioned at opposite sides of the forehearth, approximately eight inches from the center line, are tri-level thermocouples. The three couples will be positioned at the same relative depths as those at the center line. The center thermocouple on the right side will have its output used as the control temperature for a temperature override circuit connected to the electrodes. The temperature override circuit will have a set-point temperature indicator whose level is selected by the operator and this selected level is compared to the output of the middle side electrode. Typically, the operator will select the set-point temperature to be that temperature which it is desired to achieve relative to the center line thermocouple temperature indicators. Ideally, all of these temperatures will be in agreement and the temperature of the glass will then be that at which optimum working properties of the glass will be attained.

6 Claims, 3 Drawing Figures

ELECTRIC BOOSTING CONTROL FOR A GLASS FOREHEARTH

BACKGROUND OF THE INVENTION

In the conditioning and controlling of the temperature of molten glass flowing through a forehearth, it is typical that such forehearths have a series of gas burners arranged above the level of the glass at either side. The burners have their flames directed just above the surface of the glass, the effect of which is to control the amount of heat loss from the glass to the forehearth environment and atmosphere.

It is important that the glass temperature and viscosity at the time that it issues from the forehearth be closely controlled. The feeding of molten glass from the forehearth is in a stream that is divided into gobs or charges of glass in glass container manufacturing. In the melting and feeding of colored glass, it is much more difficult to control the temperature because the flame burning over the surface of the glass does not penetrate by radiation and conduction as readily as would be the case in the feeding of clear or flint glass.

The glass entering the forehearth comes from a refiner where its exit temperature is generally controlled so that the temperature of the glass adjacent the spout of the forehearth may be predicted. On standard gas heated forehearths the glass along the side of the channel runs colder than the glass in the center of the channel. With colored glasses, this normally would lead to a side temperature being 40° to 60° F. cooler than the center line temperature. In some instances, these side-to-center differences in temperature have been as high as 120° F. This temperature imbalance has a marked effect on the glass distribution in the containers made from the glass. As production speeds are increased and the bottle weights are decreased, the amount of the temperature gradient that can be tolerated becomes crucial.

Typically, thermocouples or other temperature measuring devices immersed in the glass have been used at the refiner exit or forehearth entrance. Furthermore, thermocouples have been positioned at various points along the length of the forehearth. The portion of the forehearth which is immediately next to the spout or feeder is termed the "conditioning section" of the forehearth and it is to this section of the forehearth which the present invention is specifically addressed.

Electrical heating of glass forehearths, of course, is not a new consideration and, as a recent example, reference may be had to U.S. Pat. No. 4,227,909 dated Oct. 14, 1980 and issued in the name of Hornyak, Jr., et al. This particular patent discloses an arrangement for providing joule effect heating across the channel of a forehearth by positioning of the electrodes of opposite polarities on opposite sides of the forehearth. In addition, the patent teaches an arrangement for assuring that all of the electrodes in the forehearth are kept at the same electrical potential relative to a counter-electrode immersed in the glass melter.

Another patent recently issued, U.S. Pat. No. 4,247,733 to Sevenson dated Jan. 27, 1981, discloses an electrically heated glass forehearth in which the electrodes appear to extend across the full width of the forehearth, with adjacent electrodes being of different polarity to provide a joule effect heating current therebetween. These electrodes are such as to divide the forehearth into a plurality of individual zones under separate control.

SUMMARY OF THE INVENTION

This invention relates to the system for electrically heating glass along the sidewalls of a forehearth at the front end or conditioning section only. It should be understood that other heat is applied to the forehearth by gas combustion in the usual manner and that the present invention, generally speaking, could be considered a front-end boosting by electric heat. In addition, the present invention provides a system in which a set current level selected by the operator may be applied to electrodes positioned in the conditioning section. These electrodes and the setting will provide a certain degree of boosting temperature to the sides of the forehearth. Tri-level thermocouples or thermocouples along the center line of the forehearth adjacent the spout at three levels will monitor the temperature of the glass at these three levels. A second temperature sensing device positioned adjacent the sidewall of the forehearth provides a signal to an override circuit which has a settable temperature indicator which may be in digital form. The operator may set the temperature desired and the override circuit, in response to the sidewall temperature, will provide additional current to the system for bringing the sidewall temperature up to the set point temperature. In this manner, sidewall temperature may be brought into agreement with the center line temperature, thus providing glass controlled to the optimum condition for glass container forming.

DETAILED DESCRIPTION OF THE DRAWINGS

Figure 1:
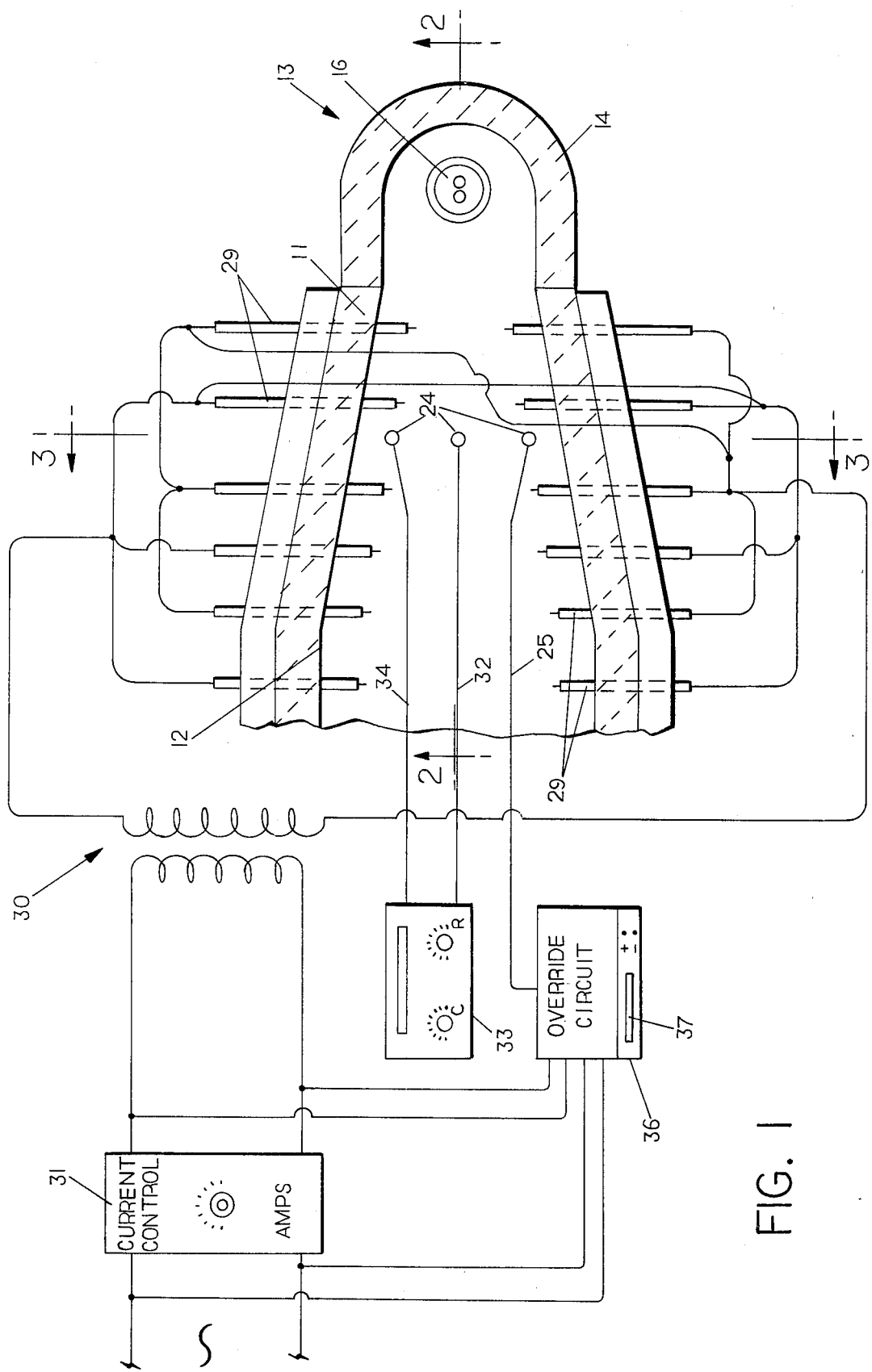
FIG. 1 is a schematic plan view of the conditioning section of the forehearth of the present invention, with the schematic electrical circuit arrangement and control therefor.

With particular reference to FIG. 1, there is shown the conditioning section of a forehearth, generally designated 10. This section of the forehearth, as seen in cross-section in FIG. 3, comprises a ceramic channel 11. The channel 11 is generally of parallel sidewall configuration extending from the refiner until reaching a point 12 where the sidewalls begin to converge toward each other. At the forwardmost end of the channel 11, where the converging sidewalls reach their closest extent, is where a feeder, or what is frequently termed a "spout" 13 is fixed. The spout 13 generally takes the form of a semicircular metal member 14 lined with heat resistant fire brick 15. The spout has a circular opening 16 in the bottom thereof. This opening will be closed by a ceramic member 8 having downwardly converging flow channels for providing one or more streams of glass which may be cut into one or more discrete mold charges. The member 8, closing the opening 16 is conventional in the art and a detailed description thereof is not believed necessary. Suffice it to say that this member termed in the art as a "ceramic feeder orifice" is supported in an orifice pan normally hinged to the feeder bowl so as to be movable up into position or away from the position of the opening 16.

Concentric above the opening 16 is a cylindrical tube 17 termed a "feeder tube." This member is rotated about its vertical axis and serves to circulate the glass around the outside thereof to equalize the temperature of the glass in the feeder. Furthermore, the lower end of the tube 17 is positioned relative to the upper edge of the opening 16 so as to control the flow rate of glass from the forehearth through the opening 16. In a typical forehearth where charges or gobs of glass are formed for delivery to bottle forming machines, a vertical plunger will be positioned within the tube 17 and the plunger will be reciprocated vertically to, in effect, extrude the glass in one or more streams and upon raising of the plunger, have the effect of stopping the flow of glass, at which time the extruded glass is cut into a discrete charge with shears. This cycle repeats itself so that discrete mold charges are fed from the feeder 13 and then fall by gravity to the forming machine.

Figure 2:
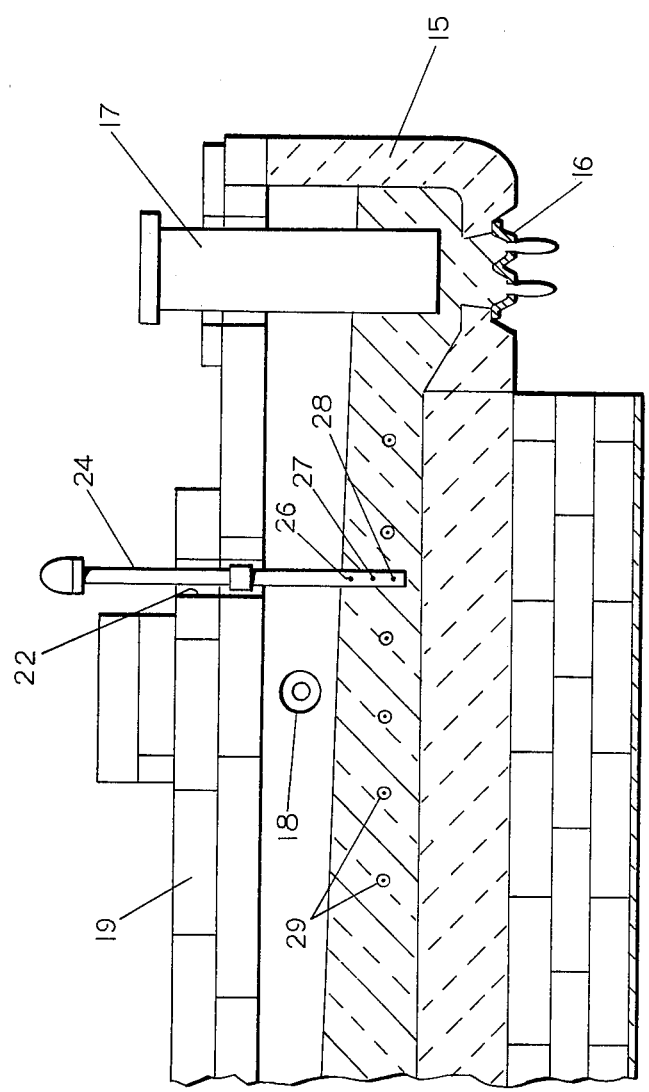
FIG. 2 is a cross-sectional view taken at line 2—2 of FIG. 1.

As shown in FIG. 2, the feeder 13 may and typically does have one or more gas burners 18 around the periphery thereof for keeping the surface of the glass in the spout or feeder at a stable temperature.

Figure 3:
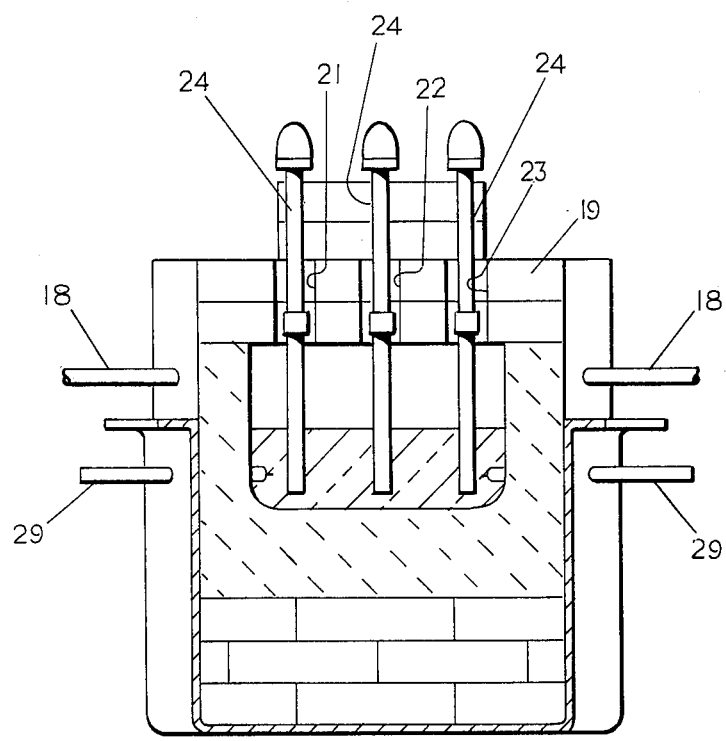
FIG. 3 is a cross-sectional view taken at line 3—3 of FIG. 1.

In forehearths of the type shown in FIGS. 1-3, the forehearth channel 11 is covered by a ceramic roof 19 made of a plurality of fire bricks 20. Normally, this roof is uninterrupted; however, as can be seen in FIGS. 2 and 3, three access holes 21, 22 and 23 are provided through the roof 19. Through each hole or openings, extends a temperature sensing device 24. As can best be seen in FIG. 3, there are three such devices, each temperature sensing device is composed of a support member 25 supporting three separate and distinct thermocouples 26, 27 and 28.

As can be seen in FIG. 2, the upper thermocouple is numbered 26, the middle thermocouple 27, and the bottom or lowest thermocouple is designated 28. Each of the temperature sensing devices is commonly referred to as a "tri-level thermocouple." However, basically, it is a temperature sensing device having three vertically spaced thermocouples carried thereby. While three couples are shown, obviously, more could be used if desired.

In the present situation, where the glass in the forehearth enters the conditioning section at approximately six inches in depth, the individual thermocouples or sensing elements of the "tri-level" may be at one inch, three inches and five inches respectively from the bottom of the channel. Thus it can be seen that the thermocouples all are immersed in the molten stream of glass and will sense the actual temperature of the glass at the position thereof.

It has been applicants' experience that, in the operation of a forehearth, it is desirable to have the center line "tri-level" thermocouple sensing elements all at as close to the same temperature as is possible. The control to achieve such a condition, by and large, must be effected by adjusting the temperature of the glass issuing from the refiner, with any additional heat, due to surface radiation, being prevented or compensated for by the firing of the gas burners along the sides of the channel prior to the glass arriving at the conditioning section of the forehearth. In some cases, the glass may be running too hot at the bottom of the center line which may necessitate cooling the bottom glass of the forehearth. Obviously, anytime it is necessary to provide extra cooling in the forehearth in order to achieve a temperature balance, some fuel is being wasted. The ideal condition would be the arrival of the glass at the tri-level thermocouple with all three couples registering the same ideal temperature for the glass composition being melted.

As previously stated, it is well known that the glass along the sides of the forehearth channel at the conditioning section tends to be 20° to 40° cooler than the glass at the center line of the forehearth. With this in mind, a plurality of electrodes 29 extending through the sidewall of the channel 11 are provided and have their ends immersed in the molten glass to approximately three inches. As can be seen, the adjacent electrodes are of opposite polarity, while opposed electrodes are of the same polarity, thus the major portion of the current flows between adjacent electrodes and only a minor portion will flow across the channel to any significant degree. Joule effect heating then occurs principally along the sidewall and only in the conditioning section in advance of the feeder or spout. The exact ratio of current flowing between adjacent electrodes versus opposite electrodes is a function of the relative spacing.

The electrodes are connected to a transformer 30 which in turn is connected to a current control device 31 and thence to a source of current. The current control device 31 is of the type that may be preset by the operator to some preselected current level. The current level chosen will be that believed to be sufficient to maintain the sidewall temperature and the centerline at a fairly close level.

All of the thermocouples 26, 27 and 28 in the center of the temperature sensing device 24 are connected by a lead 32 to a temperature indicator 33. Likewise, the three thermocouples associated with the right side thermocouple mounted in the hole 23 are connected by a lead 34 to the indicator 33. Indicator 33 may be a multi-channel temperature measuring device such as a Doric digital readout device sold by Doric Instrument Company. This instrument may provide visual readings of all of the thermocouples and, if desired, may provide recordings of these readings over a period of time. The readings given by the indicator 33 may influence the setting of the current control 31 by the operator and also provide a tool for the operator to use in setting up the glass temperature as it enters the forehearth.

The temperature sensing device mounted in the hole 21 to the left side, as viewed in FIG. 3, has its middle thermocouple connected by a lead 35 to an override circuit 36. The override circuit 36 is provided with a set point temperature scale 37 that may be selected by the operator and typically would be selected to be the same temperature reading as that of the center line of the forehearth. The override circuit, in response to deviations of the sidewall thermocouple readings will provide current adjustment to the current to the transformer 30 and this control is automatic. Thus, the override circuit will adjust the current to the electrodes so as to bring the sidewall temperature of the forehearth up to the center line temperature, or the temperature which is placed in the set point temperature scale 37. In this manner the temperature imbalance, which has a marked effect on glass distribution in bottles formed by the glass from the forehearth, is obviated and the system will provide front end boosting of the temperature and result in increased job efficiency and improved quality of ware.

We claim:

1. Apparatus for heating molten glass flowing through the conditioning section of a forehearth comprising:

a plurality of pairs of electrodes extending through the sidewalls of the forehearth with their ends terminating adjacent the sidewall thereof;

circuit means connected to said electrode pairs, said circuit means being such as to cause joule effect heating of the glass adjacent the sidewalls of the forehearth;

a source of electrical current connected to said circuit means;

a first temperature sensing means positioned within said forehearth at the center line thereof within the conditioning section adjacent the end thereof, said first sensing means including a thermocouple immersed in the glass;

a second temperature sensing means extending into the forehearth adjacent the sidewall thereof in alignment with said first sensing means;

a current controller in said circuit means;

a settable, temperature override circuit connected to said circuit means; and means connecting said second temperature sensing to said override circuit for adjusting the current to said electrodes to bring the sidewall temperature to the selected set point of said override circuit.

2. The apparatus of claim 1 wherein said first temperature sensing means is a tri-level thermocouple.

3. The apparatus of claim 2 wherein the tri-level thermocouple has a first couple adjacent the surface but immersed in the glass and two other couples at deeper levels in the glass.

4. The apparatus of claim 1 wherein said second temperature sensing means is a thermocouple immersed in the glass at approximately mid-depth thereof.

5. The apparatus of claim 1 wherein said second temperature sensing means is a tri-level thermocouple having couples at three levels in the glass with the center couple being connected to the override circuit.

6. The apparatus of claim 3 further including a temperature indicator and means for connecting all of the couples to the indicator to obtain a reading of the temperature at the three levels.

* * * * *